United States Patent
Babala et al.

(10) Patent No.: US 10,438,073 B2
(45) Date of Patent: Oct. 8, 2019

(54) AUGMENTED LANE DETECTION USING KINEMATIC DATA

(71) Applicant: TRW AUTOMOTIVE US LLC, Livonia, MI (US)

(72) Inventors: Mike Babala, Plymouth, MI (US); Gordon M. Thomas, Pleasant Ridge, MI (US)

(73) Assignee: TRW Automotive U.S. LLC, Livonia, MI (US)

(*) Notice: Subject to any disclaimer, the term of this patent is extended or adjusted under 35 U.S.C. 154(b) by 39 days.

(21) Appl. No.: 15/508,529

(22) PCT Filed: Oct. 13, 2015

(86) PCT No.: PCT/US2015/055222
§ 371 (c)(1),
(2) Date: Mar. 3, 2017

(87) PCT Pub. No.: WO2016/069253
PCT Pub. Date: May 6, 2016

(65) Prior Publication Data
US 2017/0249518 A1    Aug. 31, 2017

Related U.S. Application Data

(60) Provisional application No. 62/069,368, filed on Oct. 28, 2014.

(51) Int. Cl.
*G01C 21/36* (2006.01)
*G08G 1/16* (2006.01)
(Continued)

(52) U.S. Cl.
CPC ......... *G06K 9/00798* (2013.01); *G08G 1/167* (2013.01); *B60K 31/0008* (2013.01);
(Continued)

(58) Field of Classification Search
CPC ....... B60R 2300/804; B60R 2300/8093; B60T 2201/08; B60T 8/1755; G08G 1/167;
(Continued)

(56) References Cited

U.S. PATENT DOCUMENTS

2007/0024430 A1     2/2007  Ling et al.
2009/0284360 A1*   11/2009  Litkouhi .................. B60Q 9/00
                                                      340/439
(Continued)

OTHER PUBLICATIONS

PCT/US15/55222 International Search Report and Written Opinion—completed Nov. 23, 2015.

*Primary Examiner* — Pankaj Kumar
*Assistant Examiner* — Alazar Tilahun
(74) *Attorney, Agent, or Firm* — Tarolli, Sundheim, Covell & Tummino LLP

(57) ABSTRACT

Systems and methods are provided for detecting the departure of a vehicle from a set of land boundaries. A boundary determination component is configured to determine an associated set of lane boundaries for a vehicle. A kinematic sensor is configured to measure at least one kinematic parameter associated with the vehicle. A lane departure warning system is configured to determine if the vehicle is crossing one of the determined set of lane boundaries from the at least one kinematic parameter and provide a response signal if the vehicle is crossing one of the determined set of lane boundaries.

16 Claims, 2 Drawing Sheets

(51) Int. Cl.
*B60K 31/00* (2006.01)
*G06K 9/00* (2006.01)
*B60T 8/1755* (2006.01)
*B60W 30/10* (2006.01)
*B60W 30/18* (2012.01)
*G01S 13/93* (2006.01)

(52) U.S. Cl.
CPC ............ *B60T 8/1755* (2013.01); *B60W 30/10* (2013.01); *B60W 30/18163* (2013.01); *B60W 2550/306* (2013.01); *G01C 21/3697* (2013.01); *G01S 2013/9353* (2013.01)

(58) Field of Classification Search
CPC ........ G06K 9/00798; B60K 2350/2013; B60K 2350/1024; B60K 2350/1044; B60K 2350/106; B60K 2350/2034; B60K 2350/2039; B60K 2350/2052; B60K 2350/2095; B60K 2350/352; B60K 2350/357; B60K 2350/927; B60K 31/0008; G01S 17/936; G01S 2013/9332; G01S 13/931; G01S 17/89; G01S 2013/9314; G01S 2013/9321; G01S 2013/9342; G01S 2013/9353; G01S 2013/9378; G01S 2013/9385; G01S 7/023; G01S 11/12; G01S 17/023; G01S 17/48; G01S 7/4802; H04N 7/183; H04N 5/33; H04N 7/18; H04N 5/2253; H04N 5/23216; H04N 5/23296; G01C 21/3697; B60W 2550/306; B60W 30/10; B60W 30/18163

See application file for complete search history.

(56) References Cited

U.S. PATENT DOCUMENTS

| | | |
|---|---|---|
| 2010/0295707 A1 | 11/2010 | Bennie et al. |
| 2012/0081234 A1 | 4/2012 | Shaffer et al. |
| 2014/0052340 A1* | 2/2014 | Bajpai .................. B62D 6/00 701/42 |
| 2016/0107570 A1* | 4/2016 | Modarres ............. B60Q 9/008 340/435 |

* cited by examiner

US 10,438,073 B2

AUGMENTED LANE DETECTION USING KINEMATIC DATA

CROSS REFERENCE TO RELATED APPLICATION

The present application claims priority to U.S. Provisional Patent Application to Babala et al., Ser. No. 62/069,368 filed on Oct. 28, 2014 which is hereby fully incorporated herein by reference.

TECHNICAL FIELD

This invention relates to vehicle safety systems, and more particularly, to the use of kinematic data to augment a lane detection system.

BACKGROUND OF THE INVENTION

In road-transport terminology, a lane departure warning system is a mechanism designed to warn a driver when the vehicle begins to move out of its lane, absent a turn signal, on freeways and arterial roads. These systems are designed to minimize accidents by addressing the main causes of collisions: driver error, distractions, and drowsiness.

SUMMARY OF THE INVENTION

In accordance with an aspect of the present invention, a system includes a boundary determination component configured to determine an associated set of lane boundaries for a vehicle and a kinematic sensor configured to measure at least one kinematic parameter associated with the vehicle. A lane departure warning system is configured to determine if the vehicle is crossing one of the determined set of lane boundaries from the at least one kinematic parameter and provide a response signal if the vehicle is crossing one of the determined set of lane boundaries.

In accordance with another aspect of the present invention, a method is provided for detecting the departure of a vehicle from a set of lane boundaries. An image of a region forward of the vehicle is evaluated to determine if the vehicle appears to be crossing a lane boundary within the image. Data from a kinematic sensor is evaluated to determine if the vehicle is encountering road features associated with a road boundary. It is then determined if the vehicle is departing from the set of lane boundaries according to the determination if the vehicle appears to be crossing the lane boundary within the image and the determination if the vehicle is encountering road features associated with the road boundary and a response signal is provided.

In accordance with yet another aspect of the present invention, a vehicle safety system includes a forward looking camera configured to image a region of the road forward of the vehicle and an image analysis component configured to identify lane markings within images provided by the forward looking camera. A kinematic analysis system is configured to provide a determination if data from at least one associated accelerometer is consistent with a road feature representing a lane boundary. A lane departure warning system is configured to determine if the vehicle is exiting its current lane according to the identified lane markings and the determination provided at the kinematic analysis system and a response signal is provided if the vehicle is exiting its current lane.

DETAILED DESCRIPTION

Figure 1:
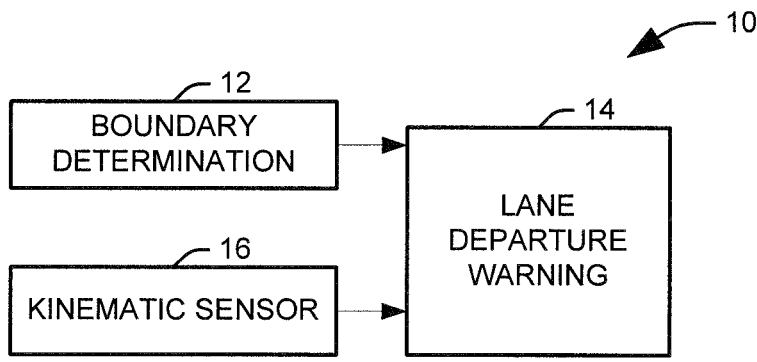
FIG. 1 illustrates a lane departure detection system for a vehicle in accordance with an aspect of the present invention.

FIG. 1 illustrates a lane departure detection system 10 for a vehicle in accordance with an aspect of the present invention. The lane departure detection system 10 includes a boundary determination component 12 configured to determine an associated set of lane boundaries for a vehicle. For example, the boundary determination component 12 can determine the location and geometry of the road within the two-dimensional image from lane markings, edge lines, and pavement boundaries, and define the position of the road from these indicators. Alternatively, the boundary determination component 14 can utilize a default road geometry to designate the position of the lane boundaries. In one implementation, the default boundaries are determined as a function of the speed of the vehicle.

The system 10 further includes a lane departure warning system 14 configured to determine if the vehicle is crossing a lane boundary. In accordance with an aspect of the present invention, the lane departure warning system 14 can receive input from a kinematic sensor 16. Specifically, the lane departure warning system 14 can receive data from the sensor 16 or an associated analysis system (not shown) indicating whether the vehicle is likely encountering road features associated with lane markings, such as rumble strips or Bott's dots.

The lane departure warning system 14 utilizes the feedback from the sensor along with the data from the boundary determination component 12 to determine if the vehicle is likely to be exiting a lane and to determine an appropriate response. For example, a visible or audible warning could be provided to the driver, haptic feedback through the steering wheel or driver's seat could provide a warning, and/or a small amount of torque could be applied to the steering wheel to restore the vehicle to the original lane. In one implementation, the lane departure warning system can indicate a departure from the lane only when data from both the sensor 16 and the boundary determination element 12 indicate that the vehicle has exited the lane boundaries. Alternatively, the vehicle stability feedback could be used to ensure the lane departure, such that a lesser response (e.g., an alarm instead of an applied torque to the steering wheel) is provided when data from only one of the sensor 16 and the boundary determination element 12 are consistent with the vehicle leaving the lane boundaries. Other methods for combining the kinematic data and the boundary data will be apparent to one of skill in the art in view of the teachings here.

Figure 2:
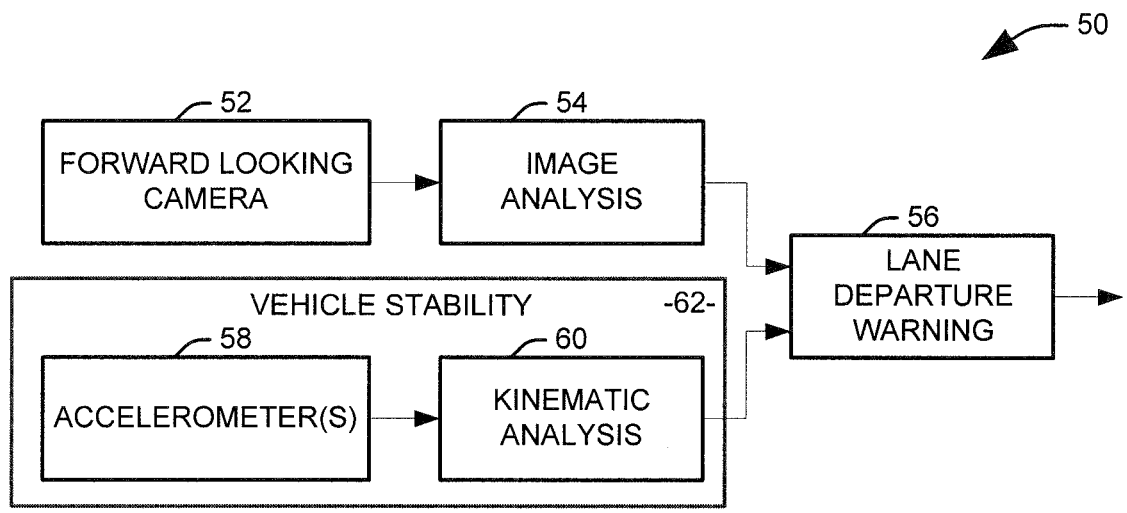
FIG. 2 illustrates an example of a vehicle safety system for a vehicle in accordance with an aspect of the present invention.

FIG. 2 illustrates an example of a vehicle safety system 50 for a vehicle in accordance with an aspect of the present invention. The vehicle safety system 50 includes a forward looking camera 52 configured to image a region of the road forward of the vehicle. The images taken at the forward looking camera 52 are provided to an image analysis component 54 configured to identify lane markings within the images. For example, the image analysis component 54 can determine the location and geometry of the road within the two-dimensional image. When appropriate data is available, the image analysis component 54 can identify lane markings, edge lines, and pavement boundaries, and define the position of the road from these indicators, for example, via an appropriate edge detection algorithm. It will be appreciated that the algorithms used to identify the lane markings, edge lines, and pavement boundaries can generate a confidence value representing the likelihood that the determined boundaries are accurate.

Where these indicators are not present or are masked by adverse road conditions, the image analysis component 54 can utilize a default road geometry to designate a portion of the image as representing the road. In the illustrated implementation, the default lane geometry utilizes the assumptions of a straight, level road and a lane width equal to that standard for a road having a speed limit consistent with the speed of the vehicle. It will be appreciated that other inputs can be utilized in constructing the default lane boundaries and tracking the vehicle location within them such as global navigation satellite systems such as the global positioning system (GPS), stored default lane geometry for important roadways, and data from the steering system, such that a departure from the default boundaries can be determined in the absence of visible feedback.

The system 50 further includes a lane departure warning system 56 configured to determine if the vehicle is exiting its current lane. In the illustrated implementation, the lane departure warning system 56 can receive input from one or more kinematic sensors and a kinematic analysis system 60. In the illustrated implementation, the kinematic sensors are a set of one or more low-G accelerometers 58 and the kinematic analysis system 60 is part of a vehicle stability system 62, although the kinematic analysis system 60 can be independent or part of another system such as an active roll control system, or another vehicle system receiving and analyzing accelerometer data. Accordingly, it will be appreciated that the output of the kinematic analysis system 60 can be used for at least one other vehicle function other than the lane departure warning system 56. The kinematic analysis system 60 can process data from the one or more accelerometers 58 to determine when the vehicle is encountering regular, periodic features in the road, such as rumble strips or Bott's dots.

In the illustrated implementation, the detected accelerometer data can be transformed into the frequency domain to locate periodicities, and located periodicities can be compared to vehicle speed information, for example, from wheel speed sensors, to determine if a detected series perturbation is likely to represent lane markings. When such a periodic series of perturbations is detected, the vehicle stability system 62 can notify the lane departure warning system 56 that road features consistent with a lane boundary, such as rumble strips or Bott's dots, have been detected. For example, a flag can be set on a vehicle bus (not shown) indicating that the vehicle stability system 62 is receiving accelerometer data consistent with haptic lane markings. It will be appreciated that, in place of a binary response, a confidence value or categorical class indicative of the likelihood that the kinematic data represents a lane boundary can be provided from the kinematic analysis system 60. For example, a magnitude of the frequency component identified as haptic lane markings can be used to determine a confidence value for this determination.

The lane departure warning system 56 can utilize data from the kinematic analysis system 57 along with the data from the image analysis component 54 to determine if the vehicle is likely to be exiting the lane and to determine an appropriate response. By adding a non-visual component to the lane departure determination, it becomes possible for the system to operate effectively in obscured environments, such as snow or heavy fog. For example, a visible or audible warning could be provided to the driver or a small amount of torque could be applied to the steering wheel to restore the vehicle to the original lane. In one implementation, the image analysis component 54 can provide a confidence value reflecting a likelihood that the vehicle is drifting out of the lane, and the input from the vehicle stability system 62 can add a predetermined or variable value to the confidence value when rumble strips or Bott's dots are detected. Alternatively, the vehicle stability feedback could be used to verify the lane departure, such that no response or a lesser response (e.g., an alarm instead of an applied torque to the steering wheel) is provided when no road features consistent with lane markers are detected. Other methods for combining the vehicle stability data and the image data will be apparent to one of skill in the art in view of the teachings here.

Figure 3:
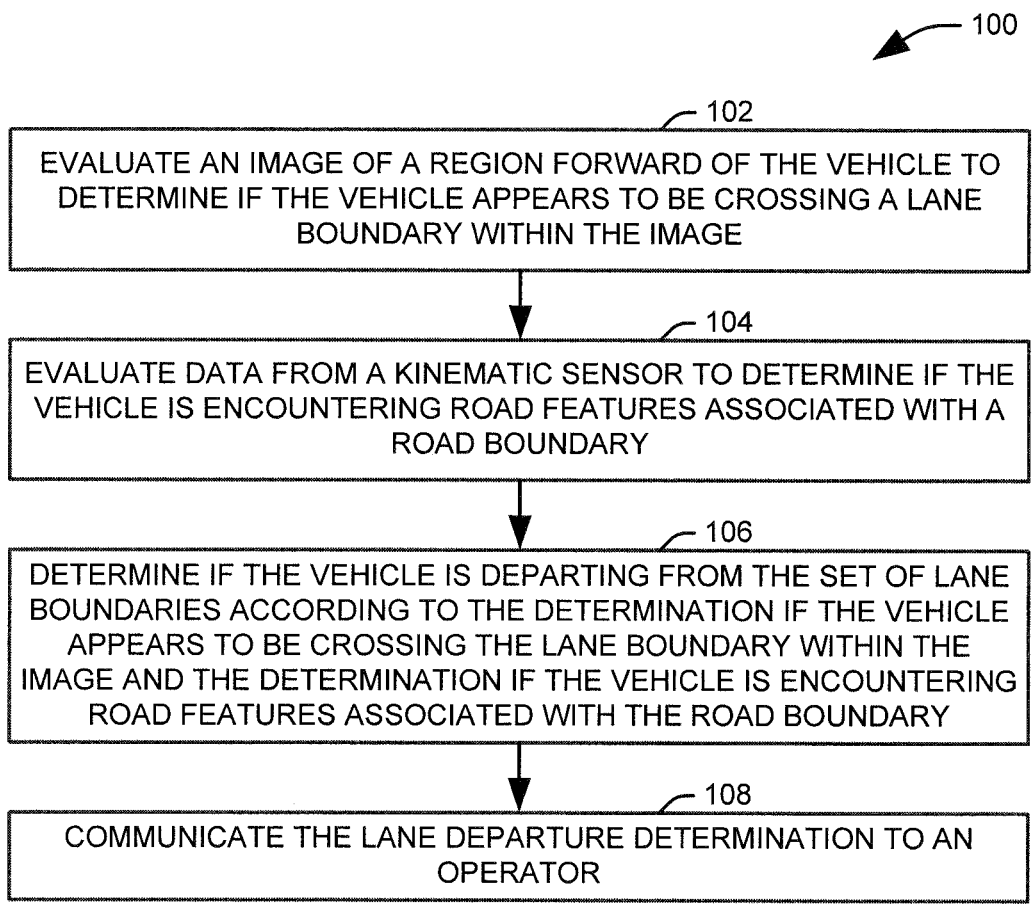
FIG. 3 illustrates a method for detecting the departure of a vehicle from a set of lane boundaries in accordance with an aspect of the present invention.

FIG. 3 illustrates a method 100 for detecting the departure of a vehicle from a set of lane boundaries in accordance with an aspect of the present invention. At 102, an image of a region forward of the vehicle is evaluated to determine if the vehicle appears to be crossing a lane boundary within the image. For example, appropriate pattern recognition processes, such as template matching and edge detection algorithms, can be applied to identify lane markings, edge lines, and pavement boundaries, and define the position of the road from these indicators. Where these indicators can not be determined with sufficient confidence, for example, with a confidence value meeting a threshold value, a default road geometry, based on the speed of the vehicle, can be used create a default set of road boundaries. Once the lane boundaries have been identified, the determination if the vehicle is crossing the lane boundary can be determined, for example, from either a position of the vehicle's tires within the image or from a known position of the tires relative to the position of the camera.

At 104, data from a kinematic sensor is evaluated to determine if the vehicle is encountering physical road features associated with a road boundary that, in effect, provide haptic feedback through the vehicle chassis. Many road boundaries are marked with haptic elements, such as rumble strips or Bott's dots, that can be detected by a kinematic sensor within the vehicle, for example, an accelerometer. Accordingly, the inventor has determined that the accuracy of the lane departure detection from the forward looking camera can be enhanced by including the haptic data in the determination. In one implementation, the data from the kinematic sensor can be transformed into the frequency domain to locate periodicities. Since the inter-feature distance is generally standard among the haptic markings and known a priori, the located periodicities can be compared to vehicle speed information to determine if the periodicities are likely to represent haptic lane markings. It will be appreciated that this information is useful for other purposes, for example, for filtering out this periodic feedback in vehicle stability systems. Accordingly, the located periodicities may be utilized for vehicle functions besides detection of lane departure.

At 106, it is determined if the vehicle is departing from the set of lane boundaries according to the determination if the vehicle appears to be crossing the lane boundary within the image and the determination if the vehicle is encountering road features associated with the road boundary. In one implementation, the vehicle can be determined to be departing from the lane boundaries if a departure is detected from either of the image data or the kinematic data. In another implementation, the vehicle can be determined to be departing from the lane boundaries if a departure is detected from both of the image data and the kinematic data. In still another implementation, the evaluation of the image data provides a confidence value representing the likelihood that the vehicle is crossing a lane boundary. If the confidence value meets a first threshold, it is determined that the vehicle is crossing a lane boundary regardless of the presence or absence of kinematic data. If the confidence value fails to meet the first threshold but meets a second threshold, it is determined that the vehicle is crossing a lane boundary only if it is also determined that the vehicle is encountering road features associated with the road boundary.

At 108, the lane departure determination is communicated to an operator of the vehicle via a response signal. If it is determined that the vehicle is departing from the set of lane boundaries, the response signal can instruct a steering system to apply a slight torque to the steering wheel of the vehicle to maintain the vehicle within the lane or instruct an appropriate vehicle system to provide a visible alarm, an audible alarm, or haptic feedback through the steering wheel or vehicle seat. In one implementation, the determination at 106 whether the vehicle is departing from the set of lane boundaries includes a determination of a confidence value representing a likelihood that the vehicle is departing from the set of lane boundaries. If the confidence value meets a first threshold, a torque can be applied to the steering wheel. If the confidence value fails to meet the first threshold but meets a second threshold, an alarm can be provided to alert the operator.

Figure 4:
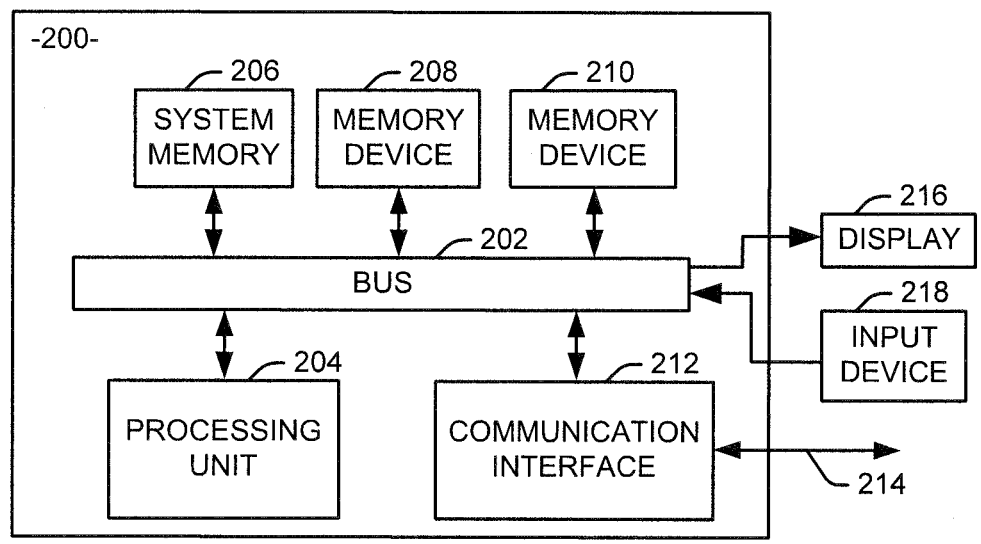
FIG. 4 is a schematic block diagram illustrating an exemplary system of hardware components capable of implementing examples of the systems and methods disclosed herein.

FIG. 4 is a schematic block diagram illustrating an exemplary control system 200 of hardware components capable of implementing examples of the systems and methods disclosed herein, such as the lane detection system described previously. The system 200 can include various systems and subsystems. The system 200 can be implemented using a vehicle-based controller connected via a vehicle bus or by using a separate lane departure controller. The computer could include a microcomputer or the desired control functions could be achieved using an application-specific integrated circuit (ASIC) arranged accordingly.

The control system 200 can include a system bus 202, a processing unit 204, a system memory 206, memory devices 208 and 210, a communication interface 212 (e.g., a network interface), a communication link 214, a display 216, and an input devices 218 (e.g., acceleration sensors, camera inputs, etc.). The system bus 202 can be in communication with the processing unit 204 and the system memory 206. The additional memory devices 208 and 210 can also be in communication with the system bus 202. The system bus 202 interconnects the processing unit 204, the memory devices 206-210, the communication interface 212, the display 216, and the input devices 218. In some examples, the system bus 202 also interconnects an additional port (not shown).

The processing unit 204 can be a microcomputer and/or can include an application-specific integrated circuit (ASIC) arranged to perform the desired processing and control functions. The processing unit 204 executes a set of instructions to implement the operations of examples disclosed herein.

The additional memory devices 206, 208 and 210 can store data, programs, instructions, database queries in text or compiled form, and any other information that can be needed to operate a computer. The memories 206, 208 and 210 can be implemented as computer-readable media.

Additionally or alternatively, the system 200 can access an external data source or query source through the communication interface 212, which can communicate with the system bus 202 and the communication link 214.

In operation, the processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system comprising:
   a boundary determination component configured to determine an associated set of lane boundaries for a vehicle;
   a kinematic sensor configured to measure at least one kinematic parameter indicating whether the vehicle is encountering road features that provide haptic feedback, the kinematic sensor including an accelerometer;
   a lane departure warning system configured to determine if the vehicle is crossing one of the determined set of lane boundaries from the at least one kinematic parameter and provide a response signal if the vehicle is crossing one of the determined set of lane boundaries, and
   a kinematic analysis system configure to transform accelerometer data into the frequency domain to locate periodicities and compare the located periodicities to vehicle speed information to determine if the periodicities are likely to represent haptic lane markings.

2. The system of claim 1, further comprising a forward looking camera configured to provide an image of a region of the road forward of the vehicle, the boundary determination component being configured to determine the associated set of lane boundaries for the vehicle from the image of a region of the road forward of the vehicle.

3. The system of claim 2, the lane departure warning system being configured to determine if the vehicle is crossing one of the determined set of lane boundaries from the at least one kinematic parameter and data from the forward looking camera.

4. The system of claim 3, the response signal being provided only if each of the at least one kinematic parameter and the data from the forward looking camera indicate that the vehicle is crossing one of the determined set of lane boundaries.

5. The system of claim 3, the response signal being provided if either of the at least one kinematic parameter and the data from the forward looking camera indicate that the vehicle is crossing one of the determined set of lane boundaries.

6. The system of claim 1, wherein the output of the kinematic sensor is provided to at least one other vehicle system.

7. The system of claim 1, wherein the boundary determination component is configured to determine the associated set of lane boundaries from a speed of the vehicle.

8. A method for detecting the departure of a vehicle from a set of lane boundaries comprising:
evaluating an image of a region forward of the vehicle to determine if the vehicle appears to be crossing a lane boundary within the image;
evaluating data from a kinematic sensor to determine if the vehicle is encountering road features that provided haptic feedback and are associated with a road boundary including transforming the data from the kinematic sensor into the frequency domain to locate periodicities and comparing the located periodicities to vehicle speed information to determining if the periodicities are likely to represent haptic lane markings;
determining if the vehicle is departing from the set of lane boundaries according to the determination if the vehicle appears to be crossing the lane boundary within the image and the determination if the vehicle is encountering road features that provide haptic feedback and are associated with the road boundary; and
providing a response signal when said determination step indicates a lane boundary departure.

9. The method of claim 8, wherein the located periodicities are utilized for at least one vehicle function besides detection of lane departure.

10. The method of claim 8, wherein evaluating an image of a region forward of the vehicle comprises determining a confidence value representing the likelihood that the vehicle is crossing a lane boundary and determining if the vehicle is departing from the set of lane boundaries comprises:
determining that the vehicle is departing the lane boundaries if the confidence value meets a first threshold; and
determining that the vehicle is departing the lane boundaries if the confidence value fails to meet the first threshold but meets a second threshold only if it is determined that the vehicle is encountering road features that provide haptic feedback and are associated with the road boundary.

11. The method of claim 8, wherein evaluating an image of a region forward of the vehicle comprises applying an edge detection algorithm to the image.

12. The method of claim 8, further comprising providing one of a visible or audible alarm if it is determined that the vehicle is departing from the set of lane boundaries.

13. The method of claim 8, wherein determining if the vehicle is departing from the set of lane boundaries comprises determining a confidence value representing a likelihood that the vehicle is departing from the set of lane boundaries, the method further comprising:
applying a torque to a steering wheel of the vehicle if the confidence value meets a first threshold; and
providing one of a visible, haptic, and audible alarm if the confidence value fails to meet the first threshold but meets a second threshold.

14. A vehicle safety system, comprising:
a forward looking camera configured to image a region of a road forward of the vehicle;
an image analysis component configured to identify lane markings within images provided by the forward looking camera;
a kinematic analysis system configured to provide a determination if data from at least one associated accelerometer is consistent with a road feature that provides haptic feedback and represents a lane boundary and configured to transform accelerometer data into the frequency domain to locate periodicities and compare the located periodicities to vehicle speed information to determine if the periodicities are likely to represent haptic lane markings; and
a lane departure warning system configured to determine if the vehicle is exiting its current lane according to the identified lane markings and the determination provided at the kinematic analysis system and providing a response signal if the vehicle is exiting its current lane.

15. The vehicle safety system of claim 14, the image analysis component being configured to provide a set of default lane boundaries from a speed of the vehicle when lane markings cannot be identified with a threshold confidence level from the images provided by the forward looking camera.

16. The vehicle safety system of claim 14, wherein the output of the kinematic analysis system is provided to at least one other vehicle system.

* * * * *